United States Patent [19]
Wen et al.

[11] Patent Number: 5,872,203
[45] Date of Patent: Feb. 16, 1999

[54] POLYURETHANE ADHESIVE COMPOSITION FOR BONDING POLYMERIC ROOFING MATERIALS TO ROOF-DECK SUBSTRATES

[75] Inventors: Wei-Jian Wen, Ypsilanti; Brian Jonathan Briddell; Kathleen Louise Lamb, both of Jackson, all of Mich.

[73] Assignee: ADCO Products, Inc., Michigan Center, Mich.

[21] Appl. No.: 533,640

[22] Filed: Sep. 25, 1995

[51] Int. Cl.$^6$ ...................................... C08G 18/08
[52] U.S. Cl. .................. 528/66; 528/73; 528/76; 528/85; 528/905; 524/730; 524/764; 524/773; 524/775; 428/423.1; 428/424.8; 428/425.1; 428/425.8
[58] Field of Search ................. 528/66, 73, 76, 528/85, 905; 524/730, 773, 775, 764; 427/423.1, 425.1, 425.8, 424.8

[56] References Cited

U.S. PATENT DOCUMENTS

| | | | |
|---|---|---|---|
| 3,743,617 | 7/1973 | Kest | 524/274 |
| 4,607,439 | 8/1986 | Harada | 428/284 |
| 4,661,542 | 4/1987 | Gilch et al. | 524/59 |
| 4,847,319 | 7/1989 | Bandlish | 524/589 |
| 4,996,812 | 3/1991 | Venable | 52/408 |
| 5,008,311 | 4/1991 | Janoski | 524/59 |
| 5,253,461 | 10/1993 | Janoski et al. | 52/408 |
| 5,319,008 | 6/1994 | Janoski | 524/59 |
| 5,421,876 | 6/1995 | Janoski | 106/269 |

FOREIGN PATENT DOCUMENTS

| | | |
|---|---|---|
| 590398 | 4/1994 | European Pat. Off. . |
| 60-109458 | 6/1985 | Japan . |
| 9309158 | 5/1993 | WIPO . |

*Primary Examiner*—Rachel Gorr
*Attorney, Agent, or Firm*—Colleen D. Szuch; Jay P. Friedenson

[57] ABSTRACT

A 100% solids polyurethane adhesive composition for bonding polymeric roofing materials to roof-deck substrates is provided which includes two components. The first component comprises a monomeric or polymeric diisocyanate, or a polyurethane prepolymer formed by the reaction of the monomeric or polymeric diisocyanate with a polyol. The second component comprises a polyol selected from the group consisting of a polyether or polyester polyol, an alkanolamine diol, a hydroxyl-terminated homopolymer of polybutadiene, and mixtures thereof. The first and second components are combined such that the ratio of isocyanate groups in the first component to the ratio of hydroxyl groups in the second component is from about 0.5:1 to 1.5:1.

11 Claims, 1 Drawing Sheet

POLYURETHANE ADHESIVE COMPOSITION FOR BONDING POLYMERIC ROOFING MATERIALS TO ROOF-DECK SUBSTRATES

BACKGROUND OF THE INVENTION

The present invention relates to a polyurethane adhesive composition, and more particularly, to a two-part polyurethane adhesive composition having 100% solids content for adhering polymeric roofing membranes to roof-deck substrates.

Roofing membranes for covering large roof areas are customarily prepared in wide sheets for installation. Elastomeric ethylene-propylene-nonconjugated diene terpolymer (EPDM) compositions are well known in the art as roofing materials due to their barrier properties against moisture and excellent outdoor exposure characteristics. Single ply EPDM roofing systems are widely used in the industry as EPDM membranes provide flexibility and continuous adhesive bonding, which is ideal for roofs with slopes and curvatures. Generally, the EPDM sheets used are 40–60 mils (0.10–0.15 20 cm) in thickness and are cut into 10' to 30' (3 to 9 m) wide panels or large sheets which result in fewer seams and faster coverage. The EPDM sheets are then adhered with a bonding adhesive to roofing deck substrates such as aluminum, cinder concrete block, wood fiber board, plywood and insulation board. Adjoining sheets are then overlapped and spliced together with splice adhesive to form a continuous, water-tight membrane.

Solvent-based neoprene adhesives have been widely used for bonding EPDM sheets to various roofing substrates. However, such adhesives contain a large amount of solvents, usually aromatic hydrocarbons, such as toluene, xylene, and others. Such solvents are environmentally undesirable and subject to increasing regulation. They have a level of toxicity when used improperly and pose a possible health hazard for the installers. Additionally, due to their flammability, a fire hazard exists. Further, the neoprene-based adhesives have been found to exhibit poor moisture resistance after prolonged exposure.

While water-based adhesives have been developed which eliminate the use of solvents, the tendency for such adhesives to freeze and coagulate in cold weather make them impractical for shipping and handling. Cold weather also increases the drying time to impractical limits. Problems have also been encountered with the bonds formed by water-based adhesives due to increase moisture sensitivity related to surfactants present in the formulations.

Other adhesive compositions have been developed which are solvent-free. For example, U.S. Pat. No. 5,421,876 to Janoski describes a one-part adhesive composition which utilizes a dispersion of asphalt in a polyurethane prepolymer. However, the dispersion is limited to the use of asphalt, which is not believed to be suitable for use with EPDM-type roofing materials as asphalt is known to soften, swell, and degrade EPDM-based compositions, which could lead to performance failure. In addition, the adhesive requires atmospheric moisture to cure, and the cure rate depends on temperature and humidity conditions.

Accordingly, there is still a need in the art for an adhesive composition for bonding roof membranes to roofing substrates which does not require the use of solvents, which provides good bond strength, and which is compatible with single-ply EPDM and other roof membranes.

SUMMARY OF THE INVENTION

The present invention meets that need by providing a two-part, 100% solids, polyurethane adhesive composition for bonding roofing membranes such as synthetic EPDM rubbers to various roof-deck substrates. The adhesive composition may be applied and cured on a job site and has low toxicity, good bond strength, is solvent free, and resists aging from exposure to heat and moisture.

According to one aspect of the present invention, a 100% solids polyurethane adhesive composition for bonding roofing materials is provided comprising first and second components. The first component is selected from the group consisting of: monomeric diisocyanates selected from the group consisting of toluene diisocyanate, methylene diphenyl diisocyanate, hexamethyl diisocyanate, isophorone diisocyanate, and hydrogenated methylene diphenyl diisocyanate; polymeric methylene diphenyl diisocyanates formed by the reaction of one of the monomeric diisocyanates; or a polyurethane prepolymer formed by the reaction of one of the monomeric or polymeric diisocyanates with a polyol selected from the group consisting of polyether and polyester polyols.

In one embodiment of the invention, the first component comprises monomeric or polymeric diisocyanates having an isocyanate content of about 33% by weight. In an alternative embodiment of the invention, the first component comprises a polyurethane prepolymer having an isocyanate content of from about 0.2–10% by weight. The polyurethane prepolymer is preferably formed by reacting from about 65–75% by weight of a polyether polyol and from about 25–35% by weight methylene dibenzene diisocyanate.

The second component of the adhesive composition comprises a polyol selected from the group consisting of a polyether polyol, a polyester polyol, a reinforced deal, hydroxyl-terminated homopolymer of polybutadiene, and mixtures thereof. The first and second components are preferably mixed such that the ratio of isocyanate groups in the first component to the ratio of hydroxyl groups in the second component is from about 0.5:1 to 1.5:1.

The second component optionally further includes a tackifier and a rheology modifier. The tackifier is preferably a liquid hydrocarbon resin selected from the group consisting of polyterpene, rosin esters, hydrogenated phenolic resin, polybutenes, and mixtures thereof. The rheology modifier is preferably selected from the group consisting of organoclay, natural clay, and fumed silica.

The second component optionally further includes an adhesion promoter. Suitable adhesion promoters include epoxysilanes, vinylsilanes, mercaptosilanes, organosilanes, and mixtures thereof.

The adhesive composition may further optionally include a plasticizer comprising a polyester selected from the group consisting of phthalates, adipates, sebacates, and trimellitates.

In use, the adhesive of the present invention is used to adhere polymeric roofing membranes to a roof-deck substrate. The first and second components (which are separately packaged) are combined in the proper ratio at the job site and applied to a roofing substrate and polymeric roofing membrane which are free of grease, oil or other contaminants which could interfere with the formation of a water-tight seal. No primer treatment is necessary. The adhesive composition becomes fully cured at room temperature (i.e., about 70°–75° F. (21°–24° C.)) after about 24 hours.

The adhesive composition of the present invention is easy to apply at a job site, and provides strong adhesive bonding of the sheets of roofing membranes to the roof deck through all widely known roof temperature extremes. The adhesive composition can be applied in a variety of weather conditions and is stable at the elevated temperatures which may be encountered on roofs.

Accordingly, it is an object of the present invention to provide a 100% solids polyurethane adhesive composition for use in adhering together polymeric roofing membranes to roof-deck substrates which provides ease of application as well as good bond strength. This, and other objects and advantages of the invention will become apparent from the following detailed description and the appended claims.

DETAILED DESCRIPTION OF THE PREFERRED EMBODIMENT

Figure 1:
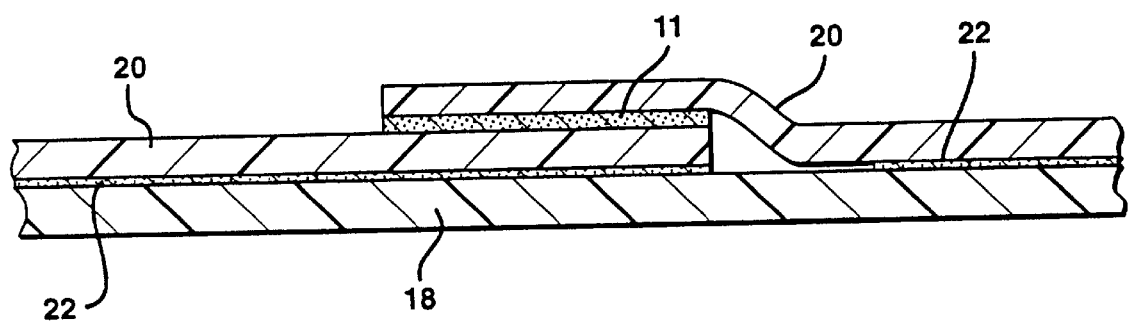
FIG. 1 is a cross-sectional side view of overlapping EPDM sheets adhered to a roof-deck substrate with the adhesive composition of the present invention.

The adhesive composition of the present invention does not rely on a free isocyanate component for moisture curing, but instead utilizes a two-part chemical curing system. By mixing the first and second components in a proper ratio prior to application, an effective adhesion composition is formed which exhibits good adhesion to various deck substrates and EPDM sheets. Further, the two-part adhesive composition eliminates the need for solvents, which have been widely used in prior art adhesive compositions.

While the adhesive composition is particularly suited for adhering EPDM-based materials, it should be appreciated that it is also suitable for use with other polymeric roofing membranes such as thermoplastic olefins, polyvinyl chloride, and chlorosulfonated polyethylene.

The adhesive composition of the present invention preferably comprises a first component selected from the group consisting of monomeric isocyanates such as toluene diisocyanate, methylene diphenyl diisocyanate, hexamethyl diisocyanate, isophorone diisocyanate, and hydrogenated methylene diphenyl diisocyanate; polymeric methylene diphenyl isocyanates formed by the reaction of one of the above monomeric isocyanates; or a prepolymer formed by the reaction of an isocyanate and a polyether or polyester polyol. In a preferred embodiment, the first component comprises methylene diphenyl diisocyanate, and more specifically, methylene dibenzene diisocyanate. The methylene dibenzene diisocyanate (MDI) is preferably in a crude polymeric form which is commercially available from Dow Plastics under the designations Papi 2027, 2580, 2094 or 2901. The different grades of MDI vary in functionality, isocyanate content, viscosity, acidity, and density. The preferred MDI grades for use in the present invention are Papi 2901 and 2094 due to their low functionality and low viscosity.

Where the first component comprises a prepolymer formed by the reaction of an isocyanate and a polyol, the polyol may be chosen from a wide range of long chain polyolefin-cap polyether or polyester polyols and preferably has a molecular weight of from 1000 to 4000. A preferred polyether polyol is available from BASF Corporation under the trade name Pluracol 2010, which has a molecular weight of about 2000.

The second component of the present invention preferably comprises a polyol selected from the group consisting of a polyether or polyester polyol, a reinforcing diol, a hydroxyl-terminated homopolymer of polybutadiene, and mixtures thereof. Optional compositions which may also be included in the second component include tackifiers, rheology modifiers, and adhesion promoters.

In a preferred form, the second component comprises from about 50–60% by weight of a polyether polyol, from about 1–5% by weight of a reinforcing diol from about 5–15% by weight of a hydroxyl-terminated homopolymer of butadiene, from about 20–30% by weight of a tackifier, from about 1–5% by weight of a rheology modifier, and from about 1–5% by weight of an adhesion promoter.

The polyether polyol in the second component is preferably Pluracol 2010 as described above. The preferred diol for use in the present invention is phenyl diisopropanolamine available from Dow Plastics under the designation Voranol 220–530. The diol functions as a reinforcement.

The hydroxyl terminated homopolymer of polybutadiene is available from ELF ATOCHEM under the designation Poly Bd R45 HT.

The preferred tackifier for use in the present invention is a hydrocarbon resin selected from the group consisting of polyterpene, rosin esters, hydrogenated phenolic resin, polybutenes and mixtures thereof. The hydrocarbon resin should preferably have a ring and ball softening point of 25° C. or below. The preferred resin is a liquid polyterpene resin available from Arizona Chemicals under the trade name Zonarez α-25.

The preferred rheology modifier for use in the adhesive composition is selected from the group consisting of organoclay, natural clay, and fumed silica. The preferred material is an organoclay available from Southern Clay Products, Inc. under the trade name Claytone APA.

The adhesion promoter which may be included in the second component is preferably selected from the group consisting of epoxysilanes, vinylsilanes, mercaptosilanes, organosilanes, and mixtures thereof. The preferred material is a vinylsilane, available from OSI Specialties, Inc. under the trade name Silane A-151.

The plasticizer component of the adhesive composition is optional and preferably comprises a polyester selected from the group consisting of phthalates, adipates, sebacates, and trimellitates.

The adhesive composition may optionally include a catalyst such as amine or tin based urethane reaction catalysts. The catalyst is preferably added to the first component of the composition. Preferred catalysts include Dibutyltin diacetate, available from Air Products & Chemicals, Inc. under the designation T-1. Typically, about 0.002 to 0.02% by weight of the catalyst may be added to the desired component of the composition.

The first and second components of the adhesive composition are preferably prepared and packaged separately, and then combined in the proper ratio for application at a job site. As shown in FIG. 1, the adhesive composition 22 of the present invention is applied between the polymeric roofing material 20 and a roof-deck substrate 18, preferably about 6 inches from the edges of the mated roofing materials. The adhesive composition is preferably allowed to cure for a minimum of 24 hours at room temperature or above to obtain optimum bond strength. The overlapping sheets 20 may then be joined with a splice adhesive 11 as shown to form a continuous, water-tight membrane.

While the composition is preferably solvent-free, it should be appreciated that a small quantity of solvent may be included in the composition where low viscosity application is desired or required. Such solvents may include toluene, xylene, and p-chlorobenzotrifluoride.

In order that the invention may be more readily understood, reference is made to the following examples of compositions within the scope of the present invention, which examples are intended to be illustrative of the invention, but are not intended to be limiting in scope.

EXAMPLE 1

A polyurethane prepolymer was prepared as the first component of the adhesive composition by combining 1000 g. of polyether polyol (Pluracol 2010), 0.2300 g. of glacial acetic acid (retardant), and 0.1200 g. of a catalyst (T-1). The mixture was then heated under vacuum at 212° F. (1000C) in a sealed reaction vessel for one hour. After the batch was cooled to room temperature, 396.38 g. of methylene dibenzene diisocyanate (Papi 2901) was added and the reaction vessel heated up to 130° F. (54.44° C.) in a nitrogen bath. Isocyanate titrations were taken 15 minutes after the reaction started. The reaction was terminated when the isocyanate content remained consistent.

EXAMPLE 2

The second component of the adhesive composition was prepared by mixing 200 g. of polyether polyol (Pluracol 2010), 10 g. phenyl diisopropanolamine (Voranol 220–530), 40 g. of a homopolymer of butadiene (Poly bd R45 HT) and 93 g. of a tackifier (Zonarez α-25). The components were mixed under vigorous agitation. When the solution became uniform, 3 g. of organoclay (Clayton APA), 4 g. of a sepiolite clay (Pangel S-9), and 10 g. of a vinylsilane adhesion promoter (Silane A151) were added to the mixture.

EXAMPLE 3

The first and second components of the adhesive composition prepared in Examples 1 and 2 were combined using a ratio of isocyanate groups to hydroxyl groups of 1.05:1 where the isocyanate content was known to be 5.9% in the first component. Using 100 grams of the first component, the required amount of the second component was calculated to be 147.8 g. The two components were then combined, and the mixture was then applied on a plurality of EPDM samples which were respectively adhered to wood fiberboard, plywood, Ultra Face ISO, aluminum, and cinder block substrates. To ensure that the EPDM samples were adhered to each substrate with uniform force, the samples were rolled with a 15 lb. metal roller. The resulting substrate assemblies were allowed to cure at room temperature (73° F.+/-1° F.) for 24 hours. The EPDM specimens were then subjected to a peel test using an Instron peel tester at room temperature. The peel rate was 2 inches per minute over a peel distance of 1 inch to 2 inches per ASTM D1876. The detailed results are reported in Table I below.

TABLE I

| | Substrate/Peel Strength (pli) | | | | |
|---|---|---|---|---|---|
| Aging Condition | Plywood | Cinder Block | Ultra Face ISO | Fiber-board | Aluminum |
| 24 hrs. at room temperature | 1.5 | 1.5 | 1.5 | 1.5 | 2.7 |
| 7 days at room temperature | 2.0 | 1.8 | 1.1 | 1.3 | 1.0 |
| 7 days in water at 158° F. | 1.0 | 0.8 | — | — | 0.6 |
| 7 days at 212° F. (pull at room temp.) | 3.5 | 2.3 | 2.2 | 1.4 | 0.9 |
| 7 days at 240° F. (pull at room temp.) | 2.3 | 2.1 | 2.9 | — | 1.8 |

TABLE I-continued

| | Substrate/Peel Strength (pli) | | | | |
|---|---|---|---|---|---|
| Aging Condition | Plywood | Cinder Block | Ultra Face ISO | Fiber-board | Aluminum |
| 7 days in water at 158° F. and 24 hours at −40° F. (pull at −40°F.) | 1.4 | 0.8 | — | — | 0.6 |

The samples were further tested by placing them in a sealed vessel at 240° F. in an oven for 30 days. The samples were examined after 30 days and were still bonded tightly. There was no evidence of delamination.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A 100% solids polyurethane adhesive composition for bonding roofing materials comprising:
    a) a first component selected from the group consisting of: monomeric diisocyanates selected from the group consisting of toluene diisocyanate, methylene diphenyl diisocyanate, hexamethyl diisocyanate, isophorone diisocyanate, and hydrogenated methylene diphenyl diisocyanate; polymeric methylene diphenyl isocyanates formed by the reaction of one of said monomeric diisocyanates; or a prepolymer formed by the reaction of one of said monomeric diisocyanates or polymeric isocyanates with a polyol selected from the group consisting of polyether and polyester polyols;
    b) a second component comprising from about 50 to 60% by weight of a polyether polyol, from about 1 to 5% by weight of a reinforcing diol, from about 5 to 15% by weight of a hydroxyl-terminated homopolymer of polybutadiene, and a tackifier; wherein the ratio of isocyanate groups in said first component to the ratio of hydroxyl groups in said second component is from about 0.5:1 to 1.5:1, and wherein said adhesive composition provides a water-tight seal upon bonding to roofing materials.

2. The adhesive composition of claim 1 in which said tackifier is a liquid hydrocarbon resin selected from the group consisting of polyterpene, rosin esters, hydrogenated phenolic resin, polybutenes, and mixtures thereof.

3. The adhesive composition of claim 1 in which said second component further includes a rheology modifier selected from the group consisting of organoclay, natural clay, and fumed silica.

4. The adhesive composition of claim 1 in which said second component includes an adhesion promoter selected from the group consisting of epoxysilanes, vinylsilanes, mercaptosilanes, organosilanes, and mixtures thereof.

5. The adhesive composition of claim 1 further including a plasticizer selected from the group consisting of phthalates, adipates, sebacates, and trimellitates.

6. The adhesive composition of claim 1 wherein said first component comprises a monomeric diisocyanate or polymeric isocyanate having an isocyanate content of about 33 by weight.

7. The adhesive composition of claim 1 wherein said first component comprises a polyurethane prepolymer having an isocyanate content of from 0.2–10% by weight.

8. The adhesive composition of claim 1 wherein said first component comprises a polyurethane prepolymer formed by reacting from about 65–75% by weight of a polyether polyol and from about 25–35% by weight polymeric methylene dibenzene diisocyanate.

9. The adhesive composition of claim 1 wherein said second component further comprises from about 1–5% by weight of an adhesion promoter.

10. The adhesive composition of claim 1 wherein said polyether polyol has a molecular weight of from 1000 to 4000.

11. A polymeric roofing membrane sealed to a roof-deck substrate with a 100% solids polyurethane adhesive composition to provide a water-tight seal, said adhesive composition comprising:
   a) a first component selected from the group consisting of: monomeric diisocyanates selected from the group consisting of toluene diisocyanate, methylene diphenyl diisocyanate, hexamethyl diisocyanate, isophorone diisocyanate, and hydrogenated methylene diphenyl diisocyanate; polymeric methylene diphenyl isocyanates formed by the reaction of one of said monomeric diisocyanates; or a prepolymer formed by the reaction of one of said monomeric diisocyanates or polymeric isocyanates with a polyol selected from the group consisting of polyether and polyester polyols;
   b) a second component comprising a polyol selected from the group consisting of a polyether polyol, a polyester polyol, a reinforcing diol, a hydroxyl-terminated homopolymer of polybutadiene, and mixtures thereof; wherein said first and second components are mixed such that the ratio of isocyanate groups in the first component to the ratio of hydroxyl groups in the second component is from about 0.5:1 to 1.5:1.

* * * * *